UNITED STATES PATENT OFFICE.

JOSEPH BRUCE WHITTEMORE, OF LONDON, ENGLAND.

ELECTRICAL PRIMARY BATTERY.

SPECIFICATION forming part of Letters Patent No. 599,411, dated February 22, 1898.

Application filed September 8, 1896. Serial No. 605,178. (Model.)

*To all whom it may concern:*

Be it known that I, JOSEPH BRUCE WHITTEMORE, a subject of the Queen of England, residing at 7 Cavendish Road, Finsbury Park, London, in the county of Middlesex, England, have invented certain new and useful Improvements in or Relating to Electrical Primary Batteries; and I do hereby declare that the following is a full, clear, and exact description of the invention, which will enable others skilled in the art to which it appertains to make and use the same.

This invention refers to improvements in or relating to electrical primary batteries by means of which improvements electrical energy can be produced at a low cost as compared with the cost of production by the primary batteries as heretofore used.

In the course of my experiments with various substances for use in electrical primary batteries I have discovered that ordinary coal, when treated in a special manner, is adapted for use with water as the liquid to make a cell from which an electric current of appreciable quantity and strength can be produced. I have also discovered that the specially-treated coal has another remarkable property, and that is that when added in a small quantity to the acid solution of an ordinary battery-cell it increases the quantity and strength of the current therefrom in such a manner and to such an extent that iron may be used in place of zinc as the positive element in the cell. The cost of treating the coal is insignificant, and as the coal is itself inexpensive it will be apparent that considerable economy will be effected in an ordinary battery by using ordinary water as the liquid of the cell in place of an acid solution and by adding thereto coal which has been treated in the manner to be hereinafter described. Economy will also be effected by adding small quantities, as required, of the specially-treated coal to the acid solution where such is used in the cell and substituting iron for the zinc or other element which is used up in the cell.

The hard or soft coal is treated in the following manner: I take a block of convenient shape and size and, say, of about four or five pounds weight, and on the top of this I place a small piece—say of about ten grains weight—of sulfur, camphor, pitch, or of any other inflammable substance which when burned in the open will ignite, and allow it to burn itself out on the top surface of the coal. When the inflammable substance has burned away or practically all burned away, the block of coal is at once adaptable for use in a water-liquid cell or as a means for augmenting the electrical properties of an acid-solution cell.

I have made and tested three double-fluid cells, each having carbon and iron elements, the liquids being water drawn from the ordinary domestic service-pipes, to which has been added coal treated in the manner above described. For the first of these cells the coal had been prepared by burning a small piece of sulfur thereon, for the second camphor had been used instead of sulfur, and for the third pitch had been used instead of sulfur or camphor. The coal is preferably added to the cell containing the carbon electrode; but it may be added to both. Each of these cells when kept at a temperature of about 60° Fahrenheit gave, when tested, a current of one volt and 0.5 ampere. The current of the cells is observed to vary. As much as one ampere at one volt has been obtained. One-half ampere at one volt has been frequently observed, but often no more than one-quarter ampere at three-quarters volt and sometimes less, depending, perhaps, upon the temperature or on the atmospheric influences. The current has been observed to continue in diminishing volume for weeks. From these results it would seem that the burning of a small quantity of an inflammable substance on coal effects a change of some kind in the molecular structure of the coal, rendering it after such treatment advantageous for use in an electrical battery; but whatever the theoretical effect on the coal may be it is certain that an electrical current of appreciable quantity and strength is produced by the use in a water-liquid cell of the coal treated in the manner before described and that no such result is produced when ordinary coal not so treated is added to the water-liquid cell. I have also tried the effect of the addition of the specially-treated coal to an acid-solution cell. For this purpose I took an ordinary Bunsen cell of three-pint capacity, and to this I added about six ounces weight of the specially-prepared coal in small pieces to the nitric-acid solution, and I substituted an iron element for the zinc. When tested, this cell gave substantially the same voltage and ampere measurements as the original Bunsen cell from which it was made.

The broad idea underlying my invention is the process carried out with some inflammable substance—as, for example, sulfur, camphor, or pitch; and therefore I claim the invention as set forth in the following claims, but at the same time call attention to the fact that instead of using pitch, as set forth in one or two of the claims, sulfur or camphor may be understood as illustrating the scope of my invention.

Having fully described my invention, what I claim, and desire to secure by Letters Patent, is—

1. The process herein described, for rendering coal adaptable for use in the liquid of primary-battery cells, consisting in burning thereon, in the open, a relatively small quantity of inflammable substance, until such substance is practically all burned away, substantially as set forth, and for the purpose stated.

2. An electrical primary battery, consisting of the positive element of iron, an acidulated electrolyte to which coal, prepared by burning thereon, in the open, an inflammable substance, is added, and a negative element of any conductive material, substantially as hereinbefore described, and for the purpose stated.

3. The process herein described, for rendering coal adaptable for use in an electrolyte, of electrical primary-battery cells, consisting of burning in the open, an additional small quantity of pitch, until such substance is practically all burned away, substantially as set forth and for the purpose stated.

4. An electrical primary battery, consisting of the positive element of iron, an acidulated electrolyte, to which coal prepared by burning thereon, in the open, pitch, is added, and a negative electrode of any conductive material, substantially as hereinbefore described and for the purpose stated.

JOSEPH BRUCE WHITTEMORE.

Witnesses:
WILLIAM S. ABRAHAM,
WILMER M. HARRIS.